(12) United States Patent
Wang

(10) Patent No.: US 9,699,691 B2
(45) Date of Patent: Jul. 4, 2017

(54) METHODS AND SYSTEM FOR EFFICIENT SELF-COEXISTENCE OF WIRELESS REGIONAL AREA NETWORKS

(75) Inventor: Jianfeng Wang, Ossining, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 228 days.

(21) Appl. No.: 13/809,924

(22) PCT Filed: Jul. 13, 2011

(86) PCT No.: PCT/IB2011/053124
§ 371 (c)(1),
(2), (4) Date: Jan. 14, 2013

(87) PCT Pub. No.: WO2012/007912
PCT Pub. Date: Jan. 19, 2012

(65) Prior Publication Data
US 2013/0114558 A1  May 9, 2013

Related U.S. Application Data

(60) Provisional application No. 61/364,440, filed on Jul. 15, 2010.

(51) Int. Cl.
*H04W 28/26* (2009.01)
*H04W 16/14* (2009.01)
(Continued)

(52) U.S. Cl.
CPC ........... *H04W 28/26* (2013.01); *H04W 16/14* (2013.01); *H04W 74/002* (2013.01); *H04W 74/02* (2013.01)

(58) Field of Classification Search
CPC .. H04B 1/1615; H04B 17/0057; G08C 17/02; H03D 7/161; H03G 3/3052; H03J 1/0091;
(Continued)

(56) References Cited

U.S. PATENT DOCUMENTS

2005/0239474 A9 * 10/2005 Liang ........................... 455/454
2009/0279491 A1   11/2009 Kim
(Continued)

FOREIGN PATENT DOCUMENTS

CN   101047430 A   10/2007
CN   101047433 A   10/2007
(Continued)

OTHER PUBLICATIONS

Mody A.N. et al., "IEEE 802.22 Wireless Regional Area Networks—Enabling Rural Broadband Wireless Access Using Cognitive Radio Technology", IEEE 802.22-10/0073r03, Jun. 2010.
(Continued)

*Primary Examiner* — Alpus H Hsu
*Assistant Examiner* — Dharmesh Patel
(74) *Attorney, Agent, or Firm* — Larry Liberchuk

(57) ABSTRACT

Scheduling self coexistence windows (SCWs) that part of frames transmitted in wireless regional area networks (WRANs) sharing a common channel. A common channel is monitored for a duration of at least a maximum SCW cycle length. The common channel is checked to determine whether a neighbor WRAN scheduled at least one coexistence beacon protocol (CBP) packet with at least one of SCWs and quiet periods (QPs). A SCW schedule is established by setting SCW schedule fields in a modified superframe control header (SCH) such that the newly established SCW schedule does not conflict with any already scheduled SCWs and QPs.

3 Claims, 7 Drawing Sheets

(51) Int. Cl.
*H04W 74/00* (2009.01)
*H04W 74/02* (2009.01)

(58) Field of Classification Search
CPC ...... H03J 3/185; H04L 1/0003; H04L 1/0026;
H04L 5/0007; H04L 5/0046; H04L 12/44;
H04L 12/403; H04L 12/2602; H04L
12/2801; H04L 12/5693; H04L 27/2608;
H04L 29/06; H04L 29/06027; H04L
29/08072; H04L 41/22; H04L 2012/5651;
H04L 2012/5679; H04M 1/733; H04M
1/72505; H04M 1/72511; H04N 5/50;
H04N 5/4401; H04Q 11/0478; H04W
4/06; H04W 16/10; H04W 16/14; H04W
24/00; H04W 24/08; H04W 28/04; H04W
28/16; H04W 28/26; H04W 48/08; H04W
48/16; H04W 52/02; H04W 52/0216;
H04W 52/0225; H04W 68/00; H04W
76/02; H04W 72/04; H04W 72/005;
H04W 72/042; H04W 84/08; H04W
84/18; H04W 88/08
USPC ............ 370/329, 341, 395.4, 431, 437, 464;
709/224; 455/67.11, 179.1, 343.4, 450,
455/464, 509, 515
See application file for complete search history.

(56) References Cited

U.S. PATENT DOCUMENTS

| 2010/0008297 | A1 | 1/2010 | Kim | |
|---|---|---|---|---|
| 2010/0009692 | A1* | 1/2010 | Shan et al. | 455/450 |
| 2010/0142559 | A1* | 6/2010 | Hu | 370/474 |
| 2010/0203914 | A1* | 8/2010 | Shan et al. | 455/509 |
| 2010/0227622 | A1* | 9/2010 | Mody et al. | 455/452.1 |

FOREIGN PATENT DOCUMENTS

| CN | 101583174 A | 11/2009 |
|---|---|---|
| EP | 1936838 A2 | 6/2008 |
| WO | WO2007031960 A2 | 3/2007 |

OTHER PUBLICATIONS

Cavalcanti D. et al., "Proposed Resolutions for Comments Related to the Superframe and Sensing", IEEE 802.22-07/0176r0, Apr. 2007.

* cited by examiner

| | |
|---|---|
| Modified SCH Format | 700 |
| Superframe Mode | 701 |
| Frame Allocation Map | 702 |
| Superframe Number | 703 |
| Tx ID | 704 |
| CP | 705 |
| Frame Preamble Length | 706 |
| Reserved | 707 |
| Length | 708 |
| Inter-Frame Flag | 709 |
| Inter-frame Quiet Period Duration | 710 |
| Inter-frame Quiet Period Offset | 711 |
| Reserved | 712 |
| Inter-frame Quiet Period Cycle Length | 713 |
| Inter-frame Quiet Period Cycle Offset | 714 |
| Inter-frame Quiet Period Cycle Frame Bitmap | 715 |
| Inter-frame Quiet Period Duration | 716 |
| Reserved | 717 |
| SCW Cycle Length | 718 |
| SCW Cycle Offset | 719 |
| SCW Cycle Frame Bitmap | 720 |
| Reserved | 721 |
| IEs | 722 |
| HCS | 723 |

FIG. 7

METHODS AND SYSTEM FOR EFFICIENT SELF-COEXISTENCE OF WIRELESS REGIONAL AREA NETWORKS

The invention generally relates to wireless regional area networks.

A wireless regional area network (WRAN), as defined by IEEE 802.22 work group, is aimed at using cognitive radio techniques. This would allow sharing of geographically unused spectrums allocated to the television broadcast service, on a noninterfering basis, to bring broadband access to hard-to-reach areas. WRANs are designed to operate in TV broadcast bands, while assuring that no harmful interference is caused to the incumbent operation, i.e., TV broadcasting and low power licensed devices (e.g., wireless microphones).

FIG. 1 illustrates an exemplary IEEE 802.22 based system 100 that includes two WRANs 110 and 120. The base stations (BS 1 and BS 2) may communicate with each other over a wide area network (WAN) 130. A customer-premises equipment (CPE) in a WRAN can communicate with its base station and with a CPE in a neighboring WRAN. For example, CPE B and CPE A in WRAN 110 exchange data with BS 1, and CPE C in WRAN 120 communicates with CPE A through channel CBP.

The system 100 can operate in a coexistence mode in which multiple base stations share the same channel. As illustrated in FIG. 2, in such a mode of operation, the channel is shared on a per frame basis. That is, a subset of frames 210 in a superframe 200 is allocated to each WRAN on a noninterference basis. In addition, each base station transmits its superframe preamble, frame preamble and superframe control header (SCH) during the first active frame allocated to the station. For example, this information would be transmitted by the BS 1 and BS 2 of WRANs 110 and 120 during frames 210-0 and 210-1, respectively. The duration of each frame 210 is fixed, and each superframe 200 includes a number of 'n' frames 210 (frames 210-0 through 210-*n*-1).

The SCH contains information required for orchestrating the transmission by the base station either in a normal mode or a coexistence mode. The specific format of a SCH header is defined in the IEEE 802.22 draft v3.0 pages 27 etc., published April 2010.

Each frame 210 may include, at its end, an intra-frame quite period (QP) or self-coexistence window (SCW). The QP or SCW are not necessarily scheduled to be included in each frame. When an intra-frame QP is scheduled, all stations (i.e., base stations and CPEs) in the WRANs keep silent during the QP, such that reliable sensing of potential incumbent signals can be performed. This is needed to protect incumbent signals in cognitive radio networks. Generally, the scheduling of the intra-frame QP is achieved by setting the Inter-frame Flag field in the SCH '0' and setting the field's Intra-frame Quiet Period Cycle Length, Intra-frame Quiet Period Cycle Offset, Intra-frame Quiet period Cycle Frame Bitmap, Intra-frame Quiet Period Duration, and Synchronization Counter for Intra-frame Quiet Period Duration to their appropriate values. The QP scheduling is further described in the above-referenced IEEE 802.22 standard.

When a SCW is scheduled, a WRAN can use the SCW to transmit a coexistence beacon protocol (CBP) packet. The CBP packet would include critical information, such as SCH data and negotiation of frame allocations. The format of a CBP packet 300 is shown in FIG. 3.

The packet 300 includes a CBP preamble 310 and a CBP MAC payload (PDU) 320. The CBP MAC PDU 320 contains SCH data 321, a CBP (beacon MAC) header 322, and a predefined number of CBP information elements (IEs) 323. By including the SCH data 321 in the CBP MAC PDU 320, the transmitting CPE or base station conveys necessary information to allow neighbor network discovery and coordination of quiet periods. That is, the SCH advertises the schedule of QPs to CPEs in other neighboring WRANs which may not be able to receive the SCH data directly from other base stations. For example, CPE C in WRAN 120 receives the CBP packet including a SCH from the CPE A in WRAN 110. It should be noted that CBP packets can be encapsulated in the IP packets for communication over WAN 130.

As the scheduling of intra-frame QPs is defined in the IEEE 802.22, there is no reliable mechanism for scheduling of SCWs disclosed in the related art. In addition, the current solution for scheduling QPs does not allow adjusting QP schedules, for example, to reduce QP duration or QP frequency without causing instability.

Certain embodiments of the invention include a method for scheduling self coexistence windows (SCWs), wherein SCWs are part of frames transmitted in wireless regional area networks (WRANs) sharing a common channel, comprises monitoring the common channel for a duration of at least a maximum SCW cycle length; checking if at least one coexistence beacon protocol (CBP) packet including at least one of SCWs and quiet periods (QPs) scheduled by neighbor WRANs is detected on the common channel; and establishing a SCW schedule by setting SCW schedule fields in a modified superframe control header (SCH), wherein the newly established SCW schedule does not conflict with any already scheduled SCWs and QPs.

Certain embodiments of the invention further include a method for scheduling two-hop based Intra-frame quiet periods (QPs), wherein QPs are part of frames transmitted in wireless regional area networks (WRANs) sharing a common channel. The method comprises monitoring the common channel for a duration of at least a maximum SCW cycle length; checking if at least one coexistence beacon protocol (CBP) packet including at least one intra-frame QP scheduled by neighbor WRANs is detected on the common channel; and establishing an intra-frame QP schedule by setting intra-frame QP schedule fields in a modified superframe control header (SCH) (700), wherein the established intra-frame QP schedule is substantially aligned with any already scheduled QPs.

Certain embodiments of the invention also include a wireless device that comprises a signal sensing module for identifying CBP packets transmitted on a common channel; a scheduler for analyzing the CBP packets to determine if self-coexistence windows (SCWs) or quiet periods (QPs) can be scheduled and for scheduling at least one of contention-based SCWs, reservation-based SCWs, and intra-frame QPs; a signal transceiver; and a spectrum manager for managing the common channel and controlling the transceiver to transmit CBP packets in scheduled SCWs or to halt any transmission during QPs.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

FIG. 7 is an illustration of a modified SCH format; and

Figure 1:
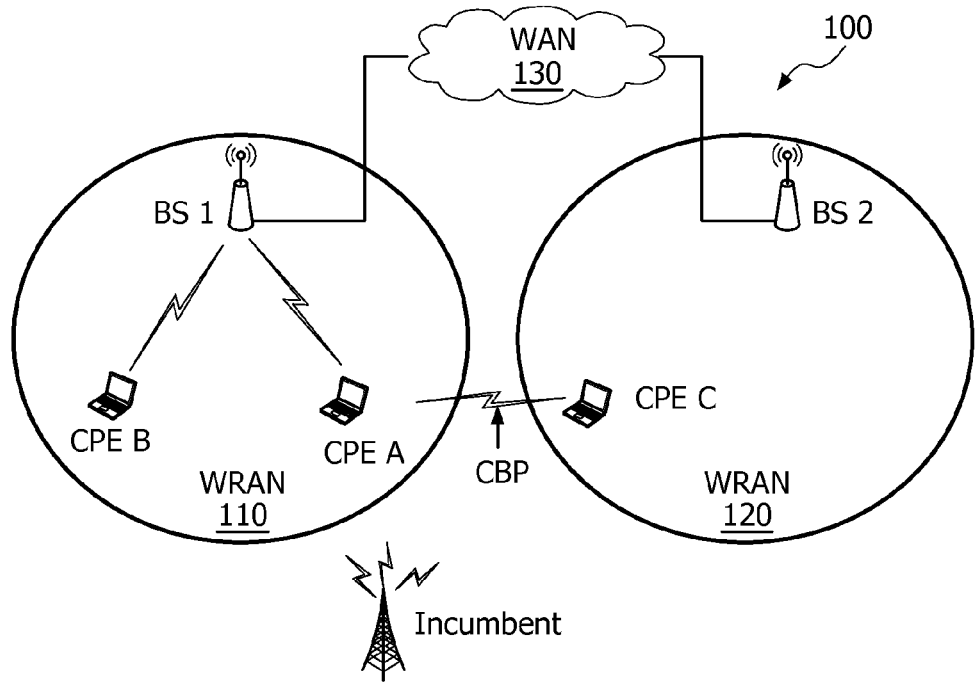
FIG. 1 is a diagram of an exemplary IEEE 802.22 communication system.
Figure 2:
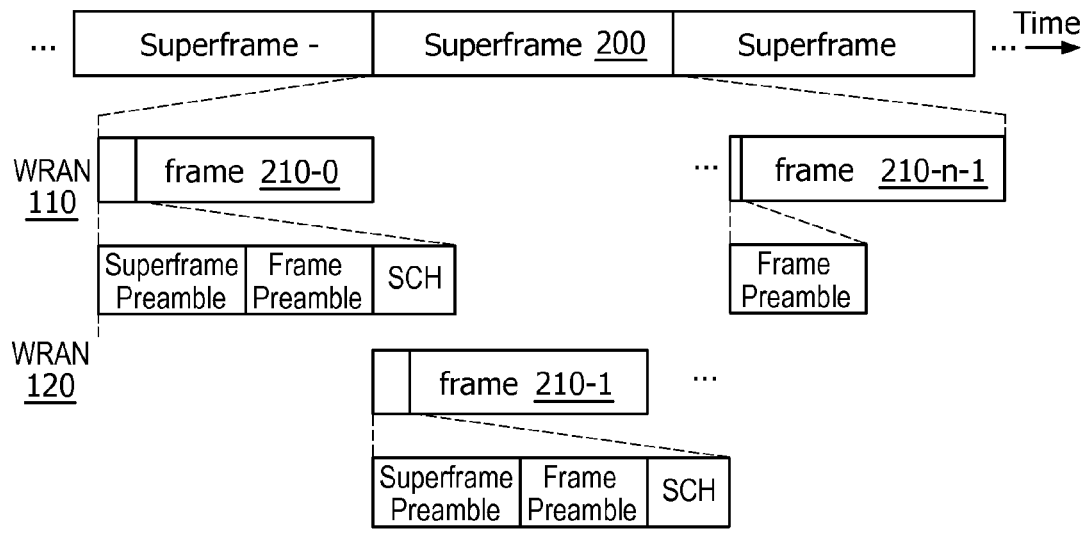
FIG. 2 is an illustration of a superframe structure in a coexistence mode.
Figure 3:
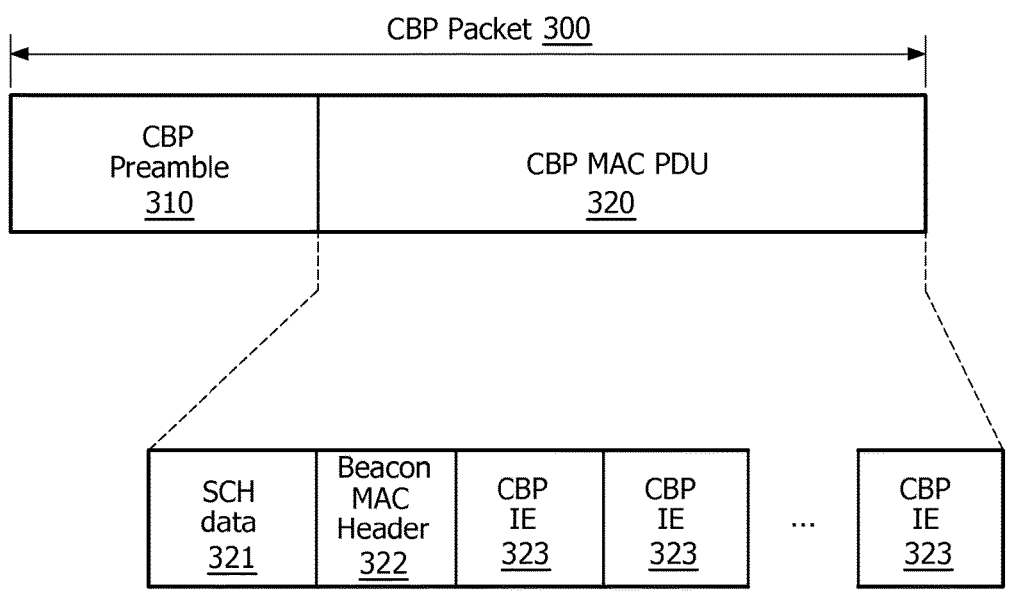
FIG. 3 is an illustration of a CPB packet format.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Various embodiments of the invention include a method for scheduling a contention-based SCW and a reservation-based SCW. As mentioned above, a SCW is part of a frame and may be included in some of the frames of a superframe. In a contention-based scheduling, the SCW is shared by neighbor WRANs. In reservation-based scheduling, the WRAN reserving a SCW has an exclusive access to the reserved SCW.

To perform SCW scheduling, the SCH is modified to include the following fields: SCW Cycle Length, SCW Cycle Offset, and SCW Cycle Frame Bitmap. An exemplary diagram of the modified SCH format is shown in FIG. 7. The SCW Cycle Length field represents, in number of superframes, the cycle interval length between each successive superframe carrying SCWs. If this field is set to 0, then no SCW cycle is scheduled. In accordance with one embodiment, the SCW Cycle Length field is set to one of five following predefined values: 1, 2, 4, 8, and 16. For example, if this field is set to 1, a SCW Cycle repeats every superframe, if the field is set to 2, a SCW Cycle repeats every 2 superframes, and so on. In an exemplary embodiment, the size of the SCW Cycle Length field is 5 bits.

The SCW Cycle Offset field specifies, as a number of superframes, the offset from the superframe carrying the SCH to the superframe where the SCW cycle should start or repeat. For example, if this field is set to 0, the SCW cycle starts from the current superframe, i.e., the superframe contains the SCH. The value of the SCW Cycle Offset field should be less than a value of the SCW Cycle length field, unless in an initial countdown state. In the initial countdown state, this field can be equal to or be larger than the value of the SCW Cycle Length field. It should be noted that a bigger initial countdown number allows neighbor WRANs to discover and avoid any potential SCW reservation collision. In an exemplary embodiment, the size of the SCW Cycle Offset field is 8 bits.

The SCW Cycle Frame Bitmap field specifies which frames in a scheduled superframe include a scheduled SCW and the SCW mode (i.e., reservation-based or contention-based). In accordance with an embodiment of the invention, each 2-bit in the Bitmap field is used to indicate four possible scheduling states of a frame: 1) no SCW scheduled; 2) a reservation-based SCW; 3) a reservation-based SCW scheduled by a direct-neighbor WRAN; and 4) a contention-based SCW.

In an exemplary embodiment of the invention, each 2-bit in the SCW Cycle Frame Bitmap is encoded as illustrated in Table 2. The current WRAN is the network that performs the scheduling method and a direct-neighbor WRAN is a neighbor of the current WRAN.

TABLE 2

| 2-Bit Value | Scheduling type |
| --- | --- |
| 00 | no SCW scheduled |
| 01 | contention-based SCW by the current WRAN |
| 10 | reservation-based SCW by a direct-neighbor WRAN |
| 11 | reservation-based SCW by the current WRAN |

In one embodiment of the invention, a fairness policy is applied to limit the number of reservation-based SCWs per WRAN and per SCW Cycle. In addition, to ensure minimum conditions for operation, at least a certain number (e.g., 1) of contention-based SCWs should be scheduled in one SCW cycle. Base stations may start scheduling their contention-based SCWs from the last frame of the superframe, going backward for multiple contention-based SCWs. This ensures more uniform and easier to converge scheduling. It should be noted that if SCW scheduling conflicts with a QP in a given frame, the QP overrides the SCW.

According to certain aspects of the invention, the SCW scheduling parameters in the SCH are transmitted by a base station. This ensures reliable transmission of such information to all CPEs. The CPEs can use CBP packets to transmit the SCW schedule information to its neighboring WRANs. It should be noted that CBP packets containing SCH may be generated directly by a base station and then transmitted to the CPEs. In such case, the CPEs need only to relay the CBP packets, instead of generating CBP packets by themselves. A base station or CPE in another WRAN may receive CBPs from the BS or CPEs.

Figure 4:
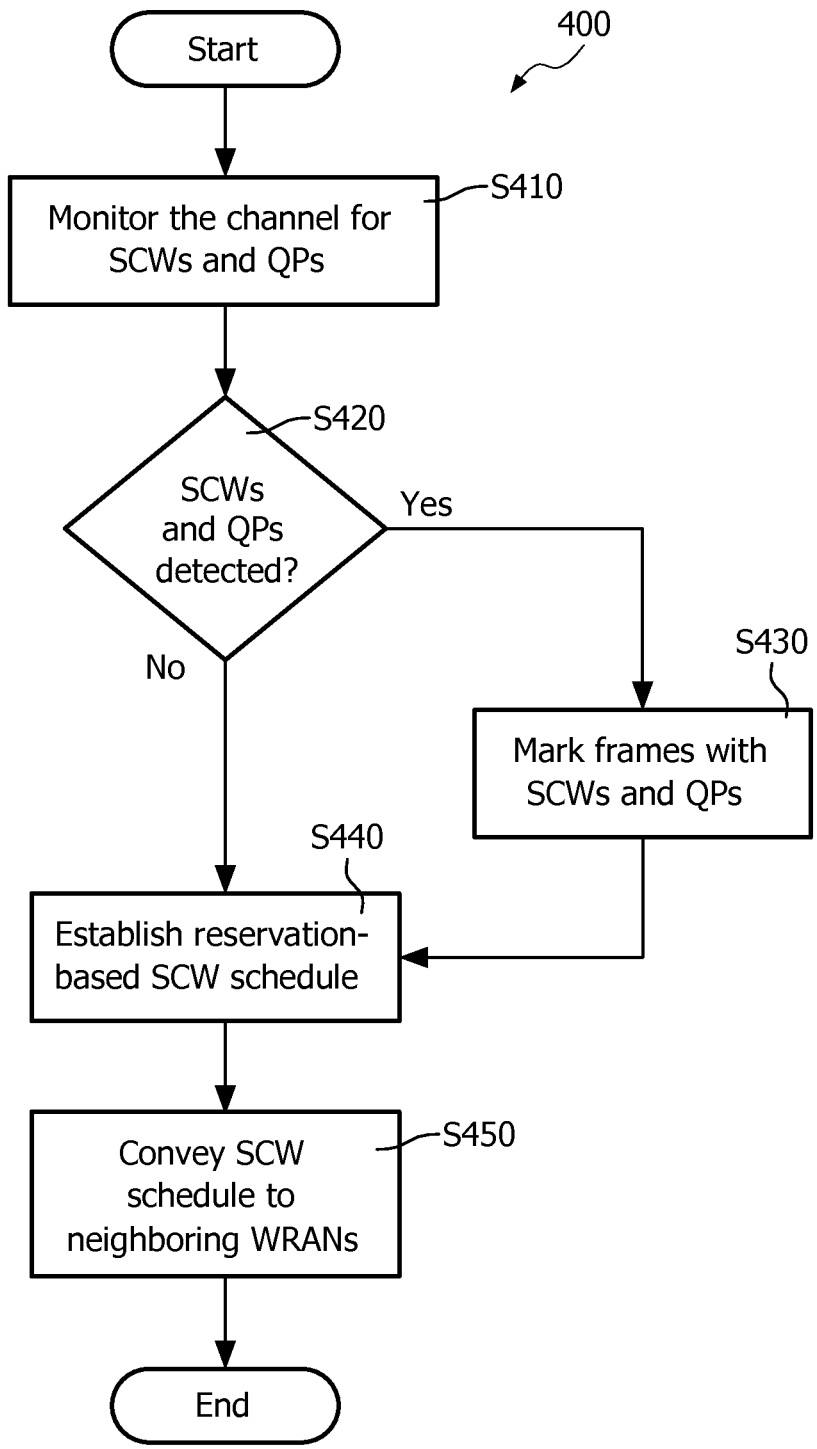
FIG. 4 is a flowchart illustrating a method for establishing a reservation-based SCW schedule in accordance with an embodiment of the invention.

FIG. 4 shows a non-limiting flowchart 400 illustrating a method for scheduling reservation-base SCWs in accordance with an embodiment of the invention. As mentioned above, a WRAN reserving a reservation-based SCW has an exclusive access to the SCW. This allows contention-free transmissions of CBP packets among neighbor WRANs sharing the same channel.

At S410, during the initialization stage of a WRAN attempting to schedule SCWs, the channel is monitored for the duration of at least a maximum SCW Cycle Length (e.g., at least 16 superframes). This is performed for the purpose of discovering neighbor WRANs and identifying their scheduled SCWs and QPs. The schedules are specified in CBP packets sent by one or more neighboring WRANs.

At S420, a check is made to determine if one or more SCWs and/or QPs scheduled by neighboring WRANs are detected. The scheduled SCWs are designated in a SCW Cycle Frame Bitmap field, where, for example, the 2-bit of a corresponding reserved frame is set to 11 or 10. If S420 results in an affirmative answer, at the S430, the frames with reserved SCWs and QPs are marked and cannot be used as reservation-based SCWs by the WRAN attempting to schedule reservation-based SCWs. Thus, the method ensures that no overlapping SCWs exist.

If S420 results in a negative answer, execution proceeds to S440 where a SCW schedule is established by setting the SCW schedule fields in the SCH. Specifically, the values of the SCW Cycle Offset field are preferably set to be larger than a value of the SCW Cycle Length field, and each 2-bit in the SCW Cycle Frame Bitmap field corresponding to a frame to be reserved is set to a value of 11.

At S450, the WRAN conveys its SCW schedule to neighboring WRANs by transmitting CBP packets (including the SCH) via contention-based SCWs scheduled by neighbor WRANs. It should be noted that the SCW schedule can be adjusted at any time by updating the values of the SCW schedule fields set at S440. The method may be performed by a base station, where monitoring of the channel is done, in part, by the CPEs in the WRAN.

In accordance with an embodiment of the invention, potential reservation conflicts after scheduling of reservation-based SCWs can be detected. According to this embodiment, the WRAN can purposely skip the transmission of a CBP packet in its reserved SCWs and schedule one CPE in the network to listen to the channel during the reserved SCWs. If a reservation conflict is identified, the WRAN will restart the process of scheduling SCWs.

Figure 5:
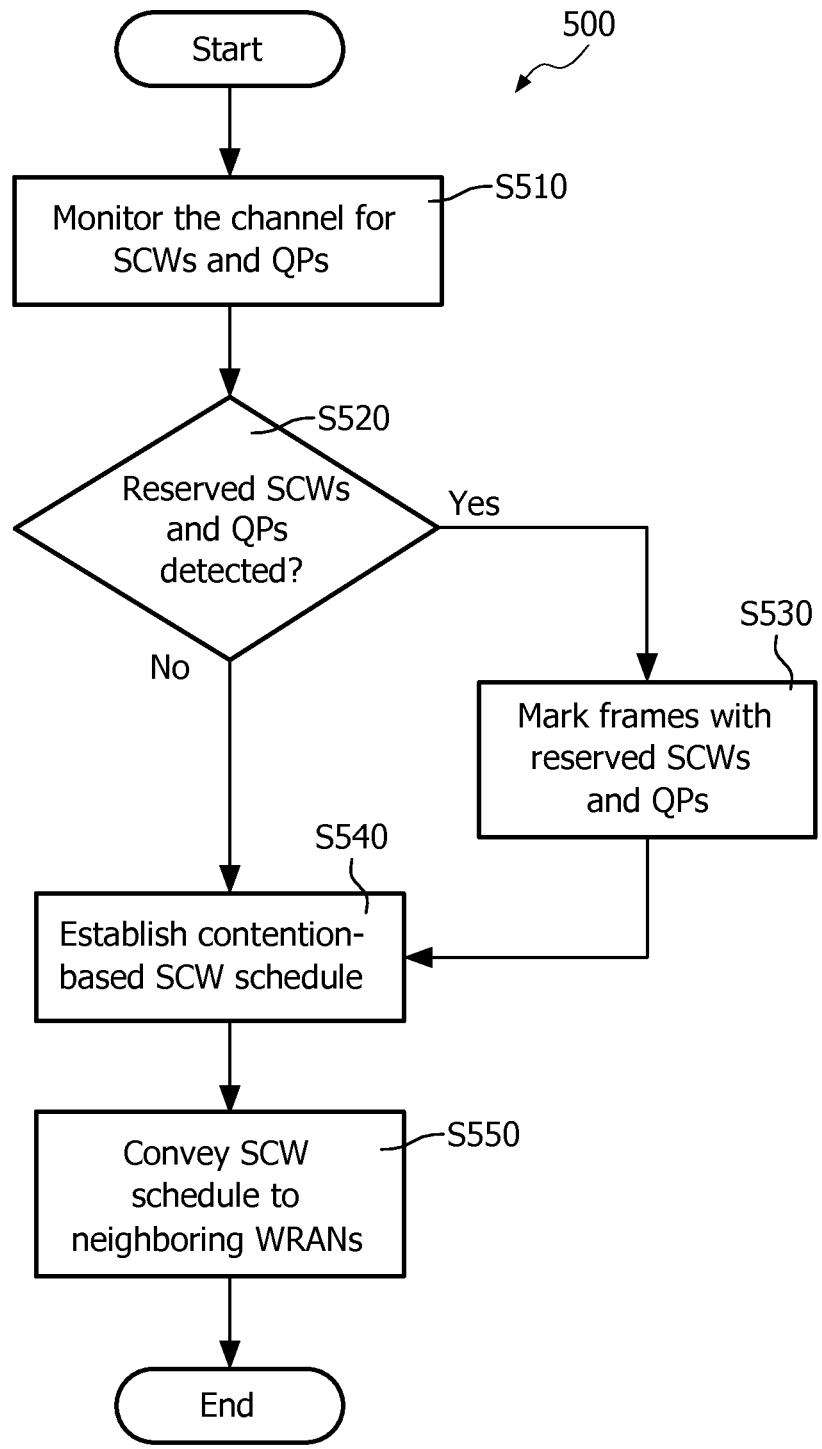
FIG. 5 is a flowchart illustrating a method for establishing a contention-based SCW schedule in accordance with an embodiment of the invention.

FIG. 5 shows a non-limiting flowchart 500 illustrating a method for scheduling contention-based SCWs in accordance with another embodiment of the invention. As mentioned above, a contention-based SCW can be shared by neighbor WRANs. The method is performed by a WRAN which will be the owner of the scheduled SCWs.

At S510, during the initialization stage of the owner WRAN, the channel is monitored for the duration of at least a maximum SCW Cycle Length (e.g., at least 16 superframes) in order to discover neighbor WRANs and identify their scheduled SCWs and QPs. The schedules are specified in CBP packets sent by one or more neighboring WRANs.

At S520, a check is made to determine if reservation-based SCWs and/or contention-based SCWs and/or QPs scheduled by other WRANs are detected. The reserved SCWs are specified in a SCW Cycle Frame Bitmap field, where, for example, the 2-bit is set to 11 or 10 in the corresponding frame. If S520 results in an affirmative answer, at the S530, the frames with reserved SCWs and QPs are marked and cannot be used as contention-based SCWs by the owner WRAN.

If S520 results in a negative answer, execution proceeds to S540, where a contention-based SCW schedule is established by setting the SCW schedule field in the SCH. Specifically, at S540, the value of the SCW Cycle Offset field is preferably set to be larger than the value of the SCW Cycle Length field. In addition, each 2-bit in the SCW Cycle Frame Bitmap field corresponding to a frame that should include a contention-based SCW is set to a value of 01. At S550, the WRAN conveys its SCW schedule to neighboring WRANs by transmitting CBP packets (including the SCH). It should be noted that the SCW schedule can be adjusted at any time by updating the values of SCW schedule fields set at S540.

Contention-based SCWs can be shared by neighbor WRANs. That is, neighbors of the owner WRAN (same as the owner WRAN) can use the contention-based SCWs for the transmission of CBP packets following the random backoff mechanisms. However, the owner WRAN has the ownership of its scheduled contention-based SCWs and other WRANs neither can use those SCWs for other purposes of transmissions nor can the other WRANs cancel the SCWs' schedules. The owner WRAN can reduce the frequency of contention-based SCWs by cancelling some, but not all, of the scheduled contention-based SCWs.

In an embodiment of the invention, two neighbor WRANs can be the co-owner of a certain set of contention-based SCWs by scheduling them in their SCHs. In this embodiment, if one WRAN cancels the scheduled contention-based SCWs, it does not affect the other WRAN. Therefore, the WRAN having the active schedule, as well as its neighbor WRANs, can still share contention-based SCWs.

According to certain aspects of the invention, a method to mitigate collision of contention among neighboring WRANs while accessing a contention-based SCW is provided. To mitigate collision of contention with neighboring WRANs, an access to a contention-based SCW should be preceded by a random backoff in a unit of contention-based SCWs. Specifically, when a base station schedules its associated CPEs to transmit CBP packets via contention-based SCWs, the base station waits for a random number (e.g., from 0 to 15 with identical probability) of next available contention-based SCWs. For example, if the random number chosen is 0, the base station schedules a CBP transmission via an US-MAP information element (IE) by accessing the first available contention-based SCW from the transmission of the US-MAP IE. If the random number is 5, the base station schedules a CBP transmission via a US-MAP IE by accessing the sixth available contention-based SCWs from the transmission of the US-MAP IE. A US-MAP IE is an IE transmitted from a base station to CPEs to schedule the transmissions (e.g., CBP transmissions to other WRANs) or other activities (e.g., CBP receptions from other WRANs) of CPEs.

Multiple WRANs operating on the same channel may share SCWs. Sharing of SCWs may reduce the total overhead in the channel. On the other hand, reservation of SCWs enables contention-free CBP packet transmissions. The decision on whether to share or reserve SCWs depends on the total overhead generated by SCWs and the coexistence scenarios. Moreover, the WRANs may change their schedule of SCWs dynamically, and therefore WRANs may adjust the schedule to adapt to coexistence scenarios.

Figure 6:
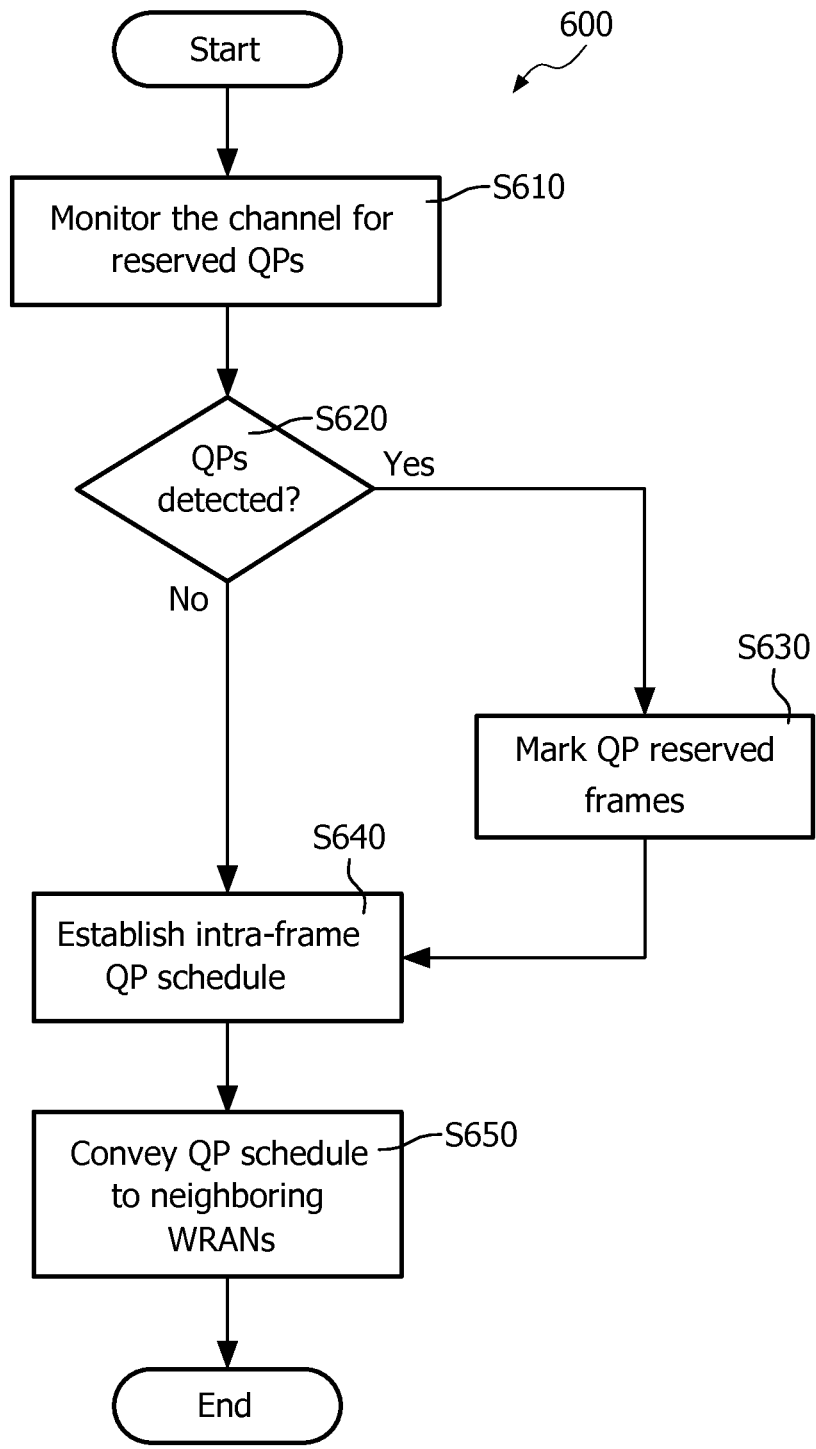
FIG. 6 is a flowchart illustrating a method for establishing an intra-frame QP schedule in accordance with an embodiment of the invention.

FIG. 6 shows a non-limiting flowchart 600 illustrating the method for establishing two-hop based Intra-frame QP schedules in accordance with one embodiment of the invention. As mentioned above, during the QP no device in any WRAN is allowed to transmit data. To allow this type of scheduling the following fields in the SCH have been modified to carry information related to the new QP scheduling method: Intra-frame Quiet Period Cycle Length, Intra-frame Quiet Period Cycle Offset, Intra-frame Quiet period Cycle Frame Bitmap, and Intra-frame Quiet Period Duration. The modified SCH format is illustrated in FIG. 7.

The Intra-frame Quiet Period Cycle Length field specifies the number of superframes for which the intra-frame sensing specification is valid. If this field is set to 0, no intra-frame quiet period is scheduled or the current intra-frame quiet period schedule is canceled. This field should be set to an integer number greater than 1 to be effective. In one embodiment, the field can be set to one of the following values 1, 2, 4, 8, and 16. In an exemplary embodiment, the size of the field is 5 bits.

Intra-frame Quiet Period Cycle Offset field is valid only if intra-frame Quiet Period Cycle Length is greater than 0 and is used for in-band intra-frame sensing. This field indicates, as a number of superframes, the offset from a SCH transmission to the beginning of the superframe where the QP cycle starts or repeats. The value of the field should be less than Intra-frame Quiet Period Cycle length unless in an initial countdown state. In the initial countdown state, this field may include a value equal or larger than a value of the Intra-frame Quiet Period Cycle Length field. In an exemplary embodiment, the size of the Intra-frame Quiet Period Cycle Offset field is 8 bits.

Intra-frame Quiet period Cycle Frame Bitmap field indicates if a QP should be part of the frame and if so by which WRAN. In an embodiment of the invention, each 2-bit in the Bitmap field corresponds to one frame within the superframe encoded as listed in Table 3.

TABLE 3

| 2-Bit Value | QP Scheduling type |
| --- | --- |
| 00 | no QP scheduled |
| 01 | Reserved |
| 10 | QP by a direct-neighbor WRAN |
| 11 | QP by the current WRAN |

The current WRAN is the network that performs the scheduling method, and a direct-neighbor WRAN is a neighbor of the current WRAN. In an exemplary embodiment, the size of this Bitmap field is 32 bits.

Intra-frame Quiet Period Duration field indicates the number of symbols (2^x: x specified by this field) starting from the end of the frame during which no transmission should take place. For example, if this field is set to 4, the intra-frame Quiet Period duration equals to 16 symbols. In an exemplary embodiment, the size of this Duration field is 8 bits.

Referring back to FIG. 6, at S610, during the initialization stage of the WRAN attempting to establish QP schedule (the current WRAN), the channel is monitored for the duration of a maximum SCW Cycle Length field (e.g., at least 16 superframes) in order to discover neighboring WRANs and identify their scheduled QPs. The schedules are specified in CBP packets or frames including a SCH and sent by one or more neighboring WRANs.

At S620, a check is made to determine if one or more intra-frame QPs scheduled by other WRANs are detected. The schedule of QPs is specified in the Intra-frame Quiet Period Cycle Frame Bitmap field within the modified SCH format 700. Each 2-bit in the Bitmap corresponds to one frame in the superframe specified by Intra-frame QP Cycle field. If the 2-bit is set to 11, an intra-frame QP is scheduled by the first hop neighbor WRAN. If the 2-bit is set to 10, an intra-frame QP is scheduled by a second hop neighbor WRAN. If S620 results in an affirmative answer, at the S630, QPs reserved with frames are marked. It should be noted that if SCWs scheduled by other WRANs are detected, those SCWs should be protected by not scheduling QPs overlapping with those SCWs.

If S620 results in a negative answer, execution proceeds to S640, where an intra-frame QP schedule is established by setting the intra-frame QP schedule fields in the SCH. Specifically, at S640, a value of the Intra-frame QP Cycle Offset field is preferably set to be larger than a value of the Intra-frame QP Cycle length field. In addition, each 2-bit in the Intra-frame QP Cycle Frame Bitmap field corresponding to a frame to be reserved is set to a value of 11. When establishing QP schedule, an attempt is made to align and thus synchronize the new schedule with QPs marked at S630.

At S650, the WRAN conveys its intra-frame QP schedule to neighboring WRANs by transmitting CBP packets (including the SCH) via contention based SCWs scheduled by neighboring WRANs. It should be noted that the intra-frame QP schedule can be adjusted at any time by updating the values of intra-frame QP schedule fields set at S640.

According to certain aspects of the invention, the method for establishing a QP schedule described herein allows reusing QPs among two-hop neighbor WRANs while keeping independence and flexibility to adjust the QP schedule (e.g., reducing QP duration or QP frequency) without causing instability. QPs can be shared and are protected by neighbor WRANs. That is, neighbor WRANs of a WRAN that scheduled the QPs (the current WRAN) can use and should protect these QPs for spectrum sensing. The current WRAN has the ownership over the scheduled QPs. Thus, other WRANs neither can use the QPs for other purposes of transmissions nor can they cancel the schedules of QPs. The current WRAN can reduce the frequency of QPs by canceling some QPs.

In an embodiment of the invention, two neighboring WRANs can be the co-owners of a certain set of intra-frame QPs by scheduling them in their SCHs respectively. In this embodiment, if one WRAN cancels the scheduled QPs, it does not affect the other WRAN. Therefore, the WRAN having the active schedule, as well as its neighbor WRANs, can still share scheduled QPs.

FIG. 7 shows an exemplary and non-limiting diagram of a modified SCH format structure 700 constructed in accordance with an embodiment of the invention. The SCH fields 701 through 712, 722 and 723 are defined in the above-referenced IEEE 802.22 standard. The Intra-frame Quiet Period Cycle Length field 713, Intra-frame Quiet Period Cycle Offset field 714, Intra-frame Quiet period Cycle Frame Bitmap field 715, and Intra-frame Quiet Period Duration field 716 are used for the intra-frame QP scheduling as shown in FIG. 6 and carry the information described in detail above. The reserved field 717 includes bits set to '0'. The values in fields 710 through 716 are set according to the Inter-frame Flag field 709. If the field's 709 value is '1', a first inter-frame QP scheduling and then intra-frame QP scheduling are performed, and the values in field 710 and 711 are set to their respective values. Otherwise, the fields 713 and 716 are set for intra-frame QP scheduling. The SCW Cycle Length field 718, SCW Cycle Offset field 719, and SCW Cycle Frame Bitmap field 720 are set for either reservation-based SCW or contention-based SCW as described in detail above. The reserved field 721 includes bits set to '0'.

Figure 8:
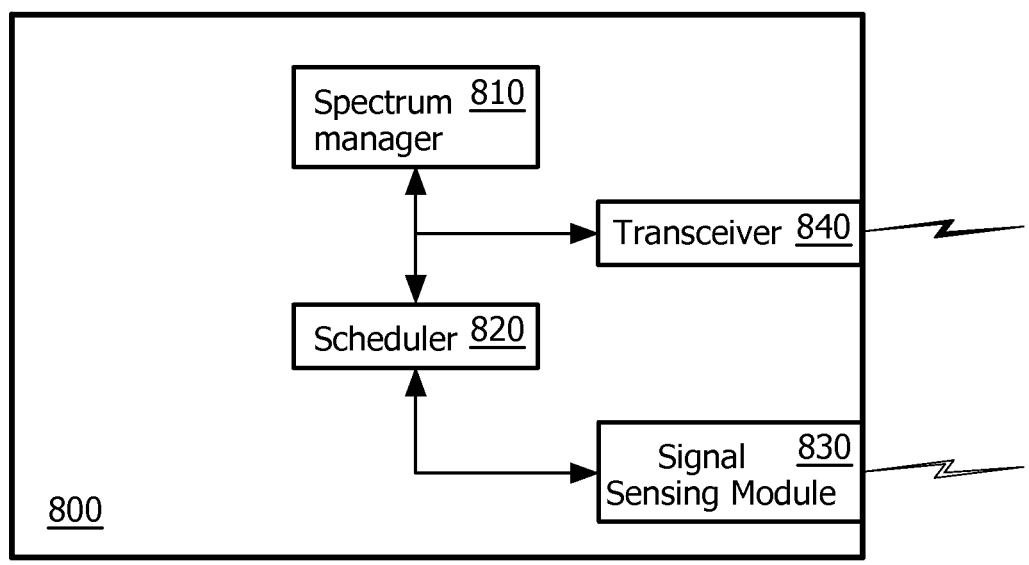
FIG. 8 is a block diagram of a wireless device in accordance with an embodiment of the invention.

FIG. 8 shows an exemplary and non-limiting block diagram of a wireless device 800 constructed in accordance with an embodiment of the invention. The wireless device 800 includes a spectrum manager 810, a scheduler 820 coupled to a signal sensing module 830, and a signal transceiver 840. The signal sensing module 830 identifies CBP packets transmitted by other WRANs and provides captured CBP packets to the scheduler 820. The scheduler 820 analyzes the CBP packets to determine if SCWs or QPs can be scheduled. The scheduler 820 is adapted to perform the method for establishing and adjusting contention-based SCW, reservation-based SCW, and intra-frame QPs scheduling as described in detail above. The spectrum manager 810 controls the transceiver 840 to manage channels and to transmit CBP packets in scheduled SCWs or to halt any transmission during QPs. The device 800 may be implemented either in a base station or a CPE.

The embodiments disclosed herein can be implemented in any IEEE 802.22 based system or in any other cognitive radio system.

The principles of the invention can be implemented as hardware, firmware, software or any combination thereof.

Moreover, the software is preferably implemented as an application program tangibly embodied on a program storage unit, a non-transitory computer readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

The invention claimed is:

1. A method for scheduling two-hop based Intra-frame quiet periods (QPs), wherein QPs are part of frames transmitted in wireless regional area networks (WRANs) sharing a common channel, the method comprising:
    monitoring the common channel for a duration of at least a maximum self-coexistence window (SCW) cycle length;
    checking if at least one coexistence beacon protocol (CBP) packet including at least one intra-frame QP scheduled by neighbor WRANs is detected on the common channel;
    establishing an intra-frame QP schedule by setting intra-frame QP schedule fields in a modified superframe control header (SCH), wherein the intra-frame QP schedule is substantially aligned with any already scheduled QPs; and
    setting every 2-bits in an Intra-frame QP Cycle Frame Bitmap field to a value indicating that a frame corresponding to the field will be used exclusively by a WRAN.

2. The method of claim 1, wherein setting the every 2-bits further comprises:
    setting a value of an Intra-frame QP Cycle Offset field to a number of superframes greater than a number of superframes assigned in an Intra-frame QP Cycle Length field.

3. The method of claim 1, further comprising:
    conveying the intra-frame QP schedule to neighbor WRANs; and adjusting the intra-frame QP schedule by updating values of SCW schedule fields.

* * * * *